United States Patent
Soulhi et al.

(10) Patent No.: US 11,063,841 B2
(45) Date of Patent: Jul. 13, 2021

(54) SYSTEMS AND METHODS FOR MANAGING NETWORK PERFORMANCE BASED ON DEFINING REWARDS FOR A REINFORCEMENT LEARNING MODEL

(71) Applicant: Verizon Patent and Licensing Inc., Arlington, VA (US)

(72) Inventors: Said Soulhi, Boston, MA (US); Bryan Christopher Larish, Westfield, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 71 days.

(21) Appl. No.: 16/683,966

(22) Filed: Nov. 14, 2019

(65) Prior Publication Data
US 2021/0152439 A1 May 20, 2021

(51) Int. Cl.
*H04L 12/24* (2006.01)
*H04L 12/26* (2006.01)

(52) U.S. Cl.
CPC .......... *H04L 41/5009* (2013.01); *H04L 41/16* (2013.01); *H04L 41/5067* (2013.01); *H04L 43/04* (2013.01); *H04L 43/0817* (2013.01); *H04L 43/50* (2013.01)

(58) Field of Classification Search
None
See application file for complete search history.

(56) References Cited

U.S. PATENT DOCUMENTS

| | | | | |
|---|---|---|---|---|
| 2012/0253860 | A1* | 10/2012 | Siddappa | G06Q 10/00 705/7.11 |
| 2017/0251418 | A1* | 8/2017 | Aweya | H04W 36/08 |
| 2020/0059417 | A1* | 2/2020 | De Buitleir | H04L 43/16 |
| 2020/0322367 | A1* | 10/2020 | Salvat Lozano | G06K 9/6264 |
| 2020/0336373 | A1* | 10/2020 | De Buitleir | H04L 41/16 |

OTHER PUBLICATIONS

De-la-Bandera et al. "Feature Extraction for Dimensionality Reduction in Cellular Networks Performance Analysis", Sensors 2020, Dec. 4, 2020 [retrieved on Mar. 19, 2021], Retrieved from the Internet: <URL:https://www.ncbi.nlm.nih.gov/pmc/articles/PMC7730729/pdf/sensors-20-06944.pdf>. (Year: 2020).*

(Continued)

*Primary Examiner* — Kevin T Bates
*Assistant Examiner* — Dae Kim

(57) ABSTRACT

A device may receive network policies of a network, and network performance data identifying KPIs of the network, and may generate an embedded space of reconstructed data that is embedded in an original space that includes the KPIs. The device may calculate reconstruction errors based on differences between the reconstructed data and the network performance data, and may calculate a convex hull of the original space. The device may calculate a convex hull of the embedded space, and may determine reward metrics based on the reconstruction errors, the convex hull of the original space, and the convex hull of the embedded space. The device may define performance baselines associated with portions, and may generate a new reward for a portion based on a particular reconstruction error, a particular convex hull of the embedded space, and a particular performance baseline. The device may perform actions based on the new reward.

20 Claims, 12 Drawing Sheets

(56) References Cited

OTHER PUBLICATIONS

Habiby et al. "Application of Reinforcement Learning for 5G Scheduling Parameter Optimization", arXiv.org:1911.07608, Oct. 21, 2019 [retrieved on Mar. 19, 2021], Retrieved from the Internet: <URL:https://arxiv.org/pdf/1911.07608>. (Year: 2019).*

Le et al. "A Practical Model for Traffic Forecasting based on Big Data, Machine-learning, and Network KPIs", 2018 15th IEEE Annual CCNC, Jan. 12, 2018 [retrieved on Mar. 19, 2021], Retrieved from the Internet: <URL:https://ieeexplore.ieee.org/document/8319255>. (Year: 2018).*

Roig et al. "Management and Orchestration of Virtual Network Functions via Deep Reinforcement Learning", arXiv.org: 1910.10695, Oct. 23, 2019 [retrieved on Mar. 19, 2021], Retrieved from the Internet: <URL:https://arxiv.org/abs/1910.10695>. (Year: 2019).*

Pandey, Binda. "Adaptive Learning for Mobile Network Management", Aalto University Master's Thesis, Nov. 2, 2016 [retrieved on Mar. 19, 2021], Retrieved from the Internet: <URL:https://core.ac.uk/download/pdf/80722716.pdf>. (Year: 2016).*

3rd Generation Partnership Project, "3rd Generation Partnership Project; Technical Specification Group Services and System Aspects; Telecommunication management; Key Performance Indicators (KPI) for Evolved Universal Terrestrial Radio Access Network (E-UTRAN): Definitions (Release 15)", Sep. 2019, 16 pages.

3rd Generation Partnership Project, "3rd Generation Partnership Project; Technical Specification Group Services and System Aspects; Telecommunication management; Key Performance Indicators (KPI) for Evolved Universal Terrestrial Radio Access Network (E-UTRAN); Requirements (Release 16)", Sep. 2019, 13 pages.

* cited by examiner

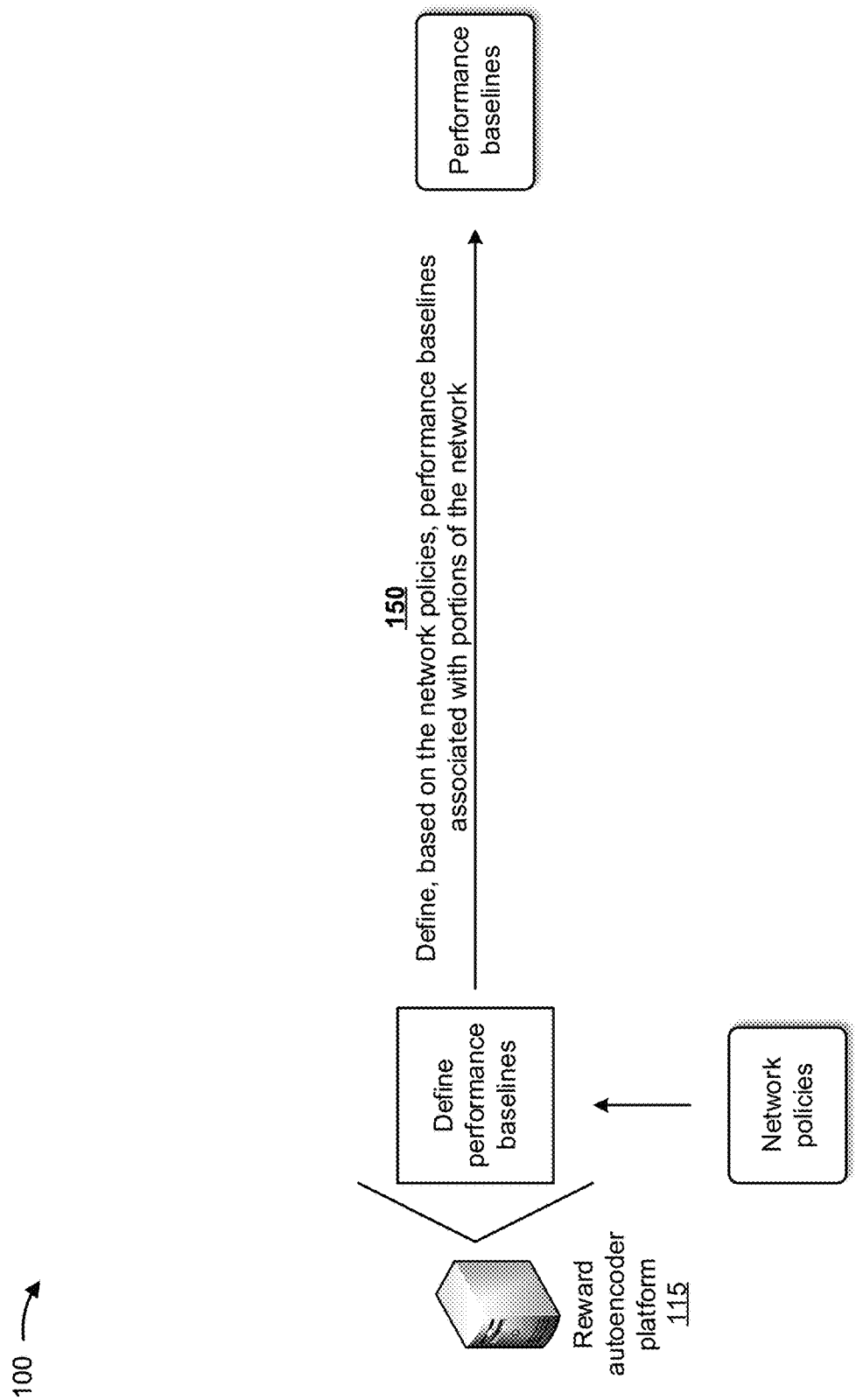

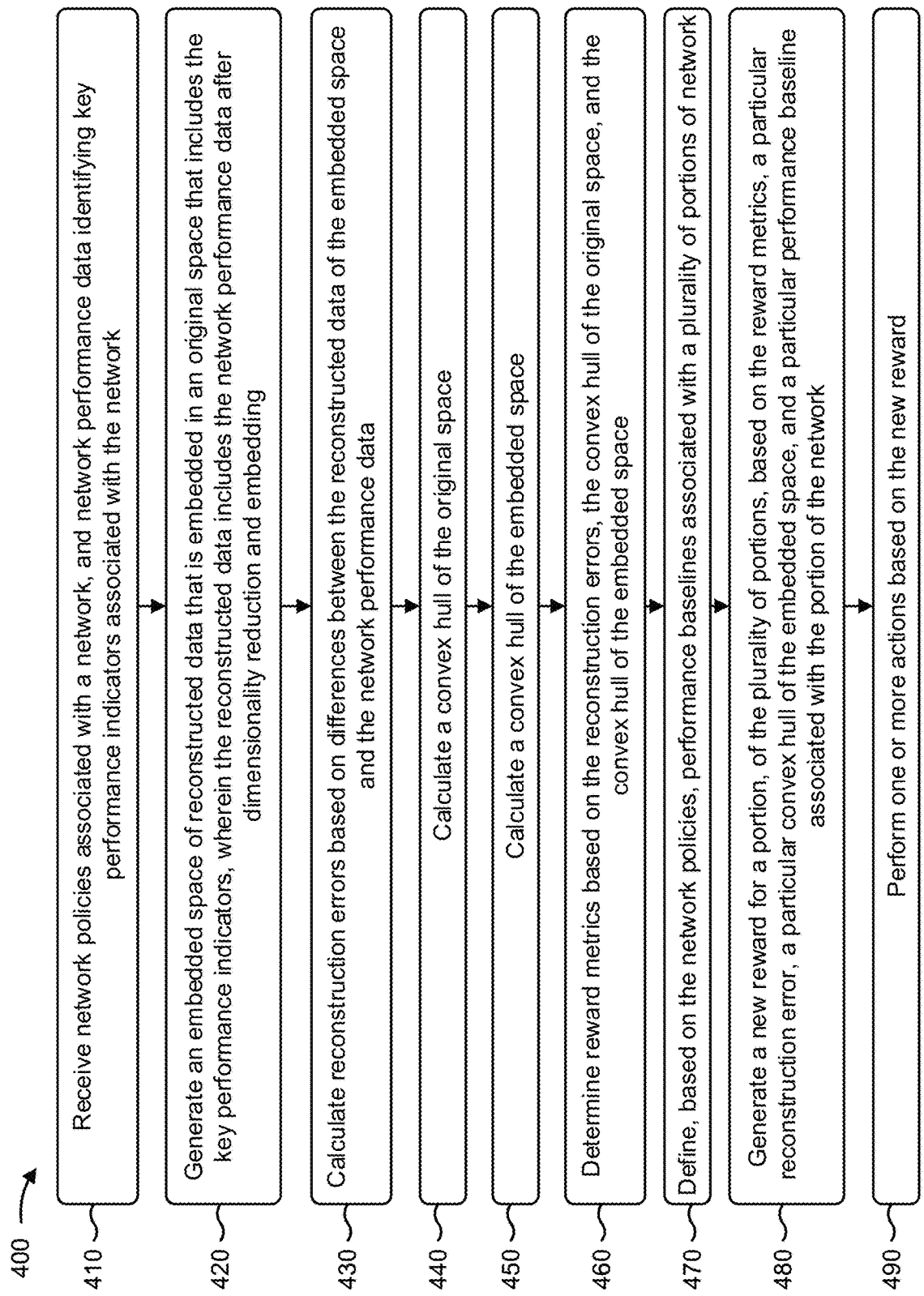

SYSTEMS AND METHODS FOR MANAGING NETWORK PERFORMANCE BASED ON DEFINING REWARDS FOR A REINFORCEMENT LEARNING MODEL

BACKGROUND

Reinforcement learning is an area of machine learning that takes a suitable action in order to maximize a reward in a particular situation. Reinforcement learning is employed by various software and machines to identify a best possible behavior or path to be taken in a specific situation.

BRIEF DESCRIPTION OF THE DRAWINGS

FIGS. 1A-1I are diagrams of one or more example implementations described herein.

FIG. 4 is a flow chart of an example process for managing network performance based on defining rewards for a reinforcement learning model.

DETAILED DESCRIPTION OF PREFERRED EMBODIMENTS

Figure 1A:
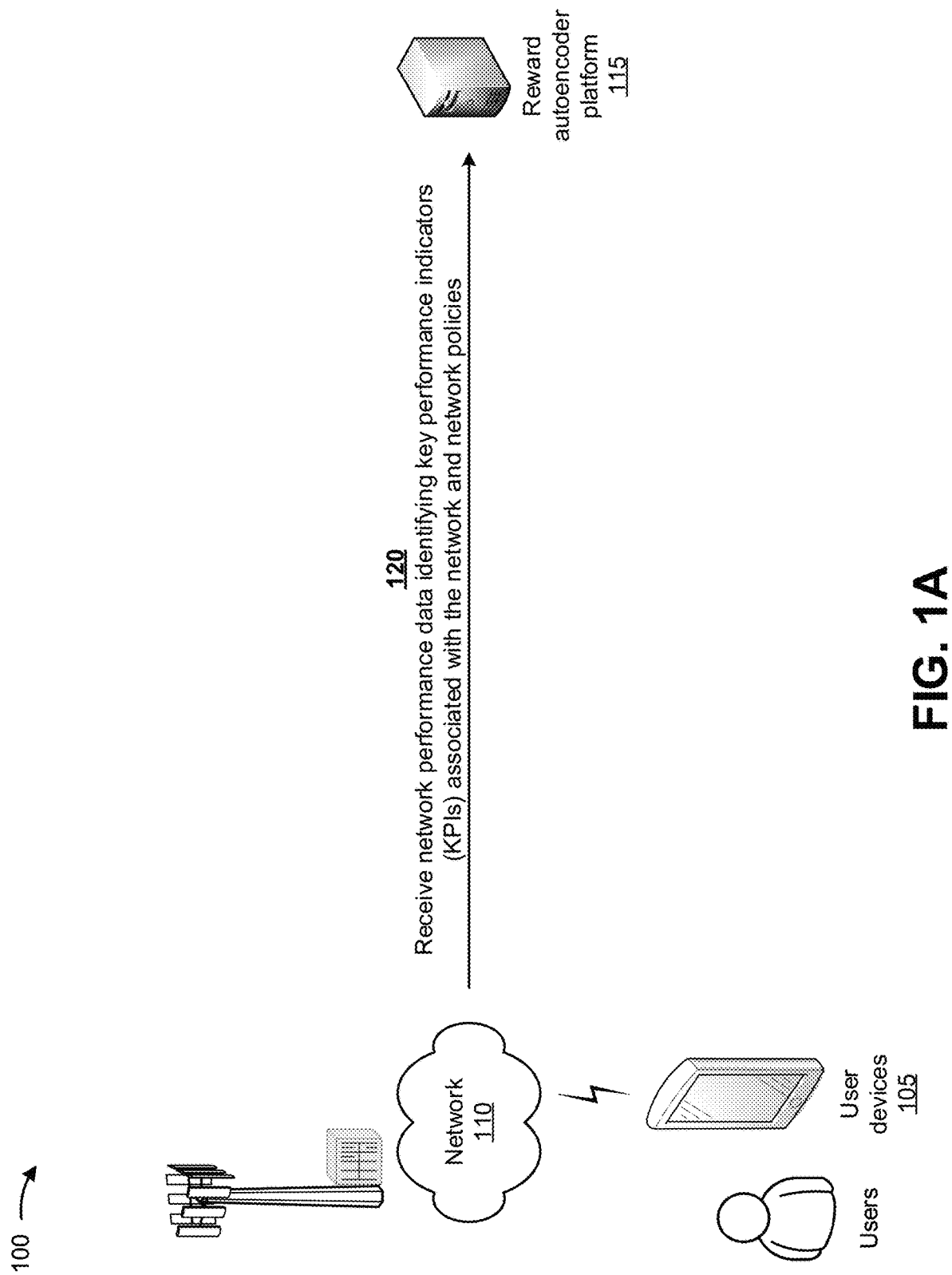

The following detailed description of example implementations refers to the accompanying drawings. The same reference numbers in different drawings may identify the same or similar elements.

Defining rewards for a reinforcement learning model is a difficult task. Modeling actions and associations of the actions to the rewards is also difficult. These difficulties result from effort and logistics associated with creating training data for training the reinforcement learning model, from dimensionality due to high dimensional performance data, loss of outlier detection by the reinforcement learning model, and/or the like. Defining rewards for a reinforcement learning model utilized with network performance data is even more difficult since network performance data is highly dimensional and may not accurately reflect network performance. Thus, current techniques for managing network performance waste computing resources (e.g., processing resources, memory resources, communication resources, and/or the like), networking resources, and/or the like associated with failing to define rewards, managing network performance based on incorrect rewards, correcting an inappropriately managed network, and/or the like.

Some implementations described herein provide a reward autoencoder platform for managing network performance based on generating rewards for a reinforcement learning model. For example, the reward autoencoder platform may receive network policies associated with a network, and network performance data identifying key performance indicators associated with the network, and may generate an embedded space of reconstructed data that is embedded in an original space that includes the key performance indicators, where the reconstructed data includes the network performance data after dimensionality reduction and embedding. The reward autoencoder platform may calculate reconstruction errors based on differences between the reconstructed data of the embedded space and the network performance data, and may calculate a convex hull of the original space. The reward autoencoder platform may calculate a convex hull of the embedded space, and may determine reward metrics based on the reconstruction errors, the convex hull of the original space, and the convex hull of the embedded space. The reward autoencoder platform may define, based on the network policies, performance baselines associated with a plurality of portions of the network and representing the best performing sectors, and may generate a new reward for a portion of the network, of the plurality of portions of the network, based on the reward metrics, a particular reconstruction error, a particular convex hull of the embedded space, and a particular performance baseline associated with the portion of the network. The reward autoencoder platform may perform one or more actions based on the new reward.

In this way, the reward autoencoder platform manages network performance based on defining rewards for a reinforcement learning model. The defined rewards may enable automatic discovery of anomalies in a network and automatic improvements to network performance (e.g., improvements to network policies); may distinguish an optimal network policy from other network policies; and/or the like. Thus, the reward autoencoder platform conserves computing resources, networking resources, and/or the like that would otherwise be wasted in failing to define rewards, managing network performance based on incorrect rewards, correcting an inappropriately managed network, and/or the like.

FIGS. 1A-1I are diagrams of one or more example implementations 100 described herein. As shown in FIG. 1A, user devices 105 may be associated with users, a network 110, and a reward autoencoder platform 115 with reward computation functionality. User devices 105 may include mobile devices, computers, telephones, set-top boxes, and/or the like that the users may utilize to interact with and/or retrieve information from network 110. Network 110 may include a wired and/or wireless network that may provide, for example, connectivity services to user devices 105 using one or more network devices (e.g., switches, routers, access points, nodes, databases, controllers, servers, gateways, and/or the like). Reward autoencoder platform 115 may include a platform that manages network performance of network 110 based on defining rewards for a reinforcement learning model used to optimize performance of network 110.

As further shown in FIG. 1A, and by reference number 120, reward autoencoder platform 115 may receive network performance data identifying key performance indicators (KPIs) associated with network 110, and may receive network policies associated with network 110. The KPIs may include a latency associated with network 110, jitter associated with network 110, a packet loss associated with network 110, utilization associated with network 110, throughput associated with network 110, a quality of service associated with network 110, a reference signal received power associated with network 110, received interference power, radio link measurements, and/or the like. In some implementations, the network performance data may be associated with one or more particular categories of network performance data. For example, the network performance data may be associated with one or more geographical areas, one or more time periods, one or more network devices, and/or the like.

In some implementations, the network performance data may be received from network 110. For example, the network performance data may be received from one or more network devices (e.g., one or more wireless access points, eNodeBs, gNodeBs, and/or the like). In some implementations, the network devices may provide the network performance data to one or more collection points associated with network 110, and the network performance data may be received from the one or more collection points. In some implementations, reward autoencoder platform 115 may periodically receive the network performance data, may continuously receive the network performance data, may receive the network performance data based on a request, and/or the like. In some implementations, reward autoencoder platform 115 may store the network performance data in a data structure (e.g., a database, a table, a list, and/or the like) associated with reward autoencoder platform 115.

Figure 1B:
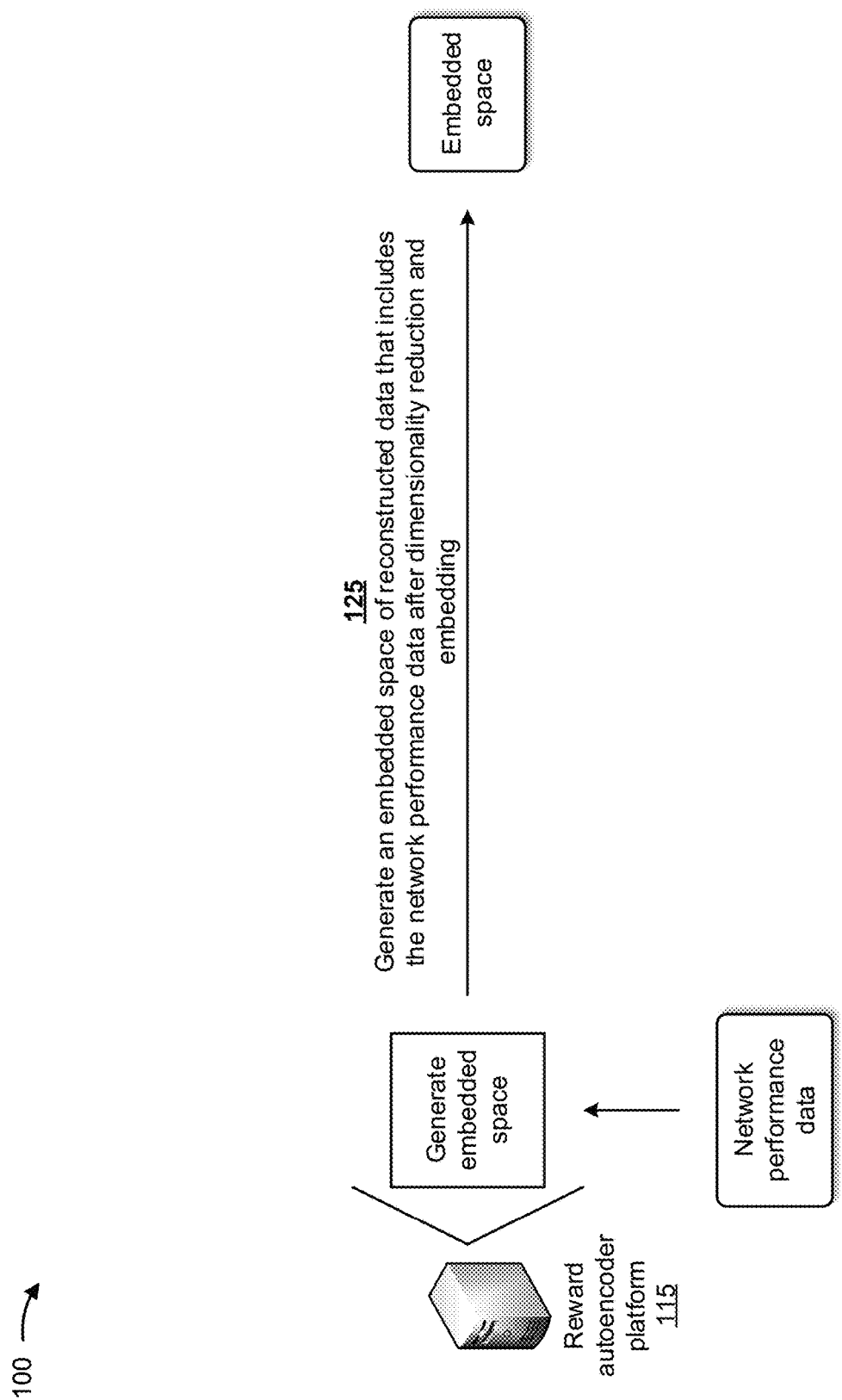

As shown in FIG. 1B, and by reference number 125, reward autoencoder platform 115 may generate an embedded space of reconstructed data that includes the network performance data after dimensionality reduction and embedding. In some implementations, reward autoencoder platform 115 may reduce dimensions of the network performance data to capture features of the network performance data, and may restore the dimensions to the network performance data. Reward autoencoder platform 115 may apply weights to the network performance data, after restoring the dimensions, based on the features of the network performance data, and may generate the reconstructed data of the embedded space based on the weighted network performance data. For example, In some implementations, reward autoencoder platform 115 may process the network performance data, with a kernel density estimation, to generate the embedded space of the reconstructed data. The kernel density estimation may include a non-parametric process to estimate a probability density function of a random variable. Kernel density estimation may include a fundamental data smoothing technique where inferences about a data population are made based on a finite data sample.

Figure 1C:
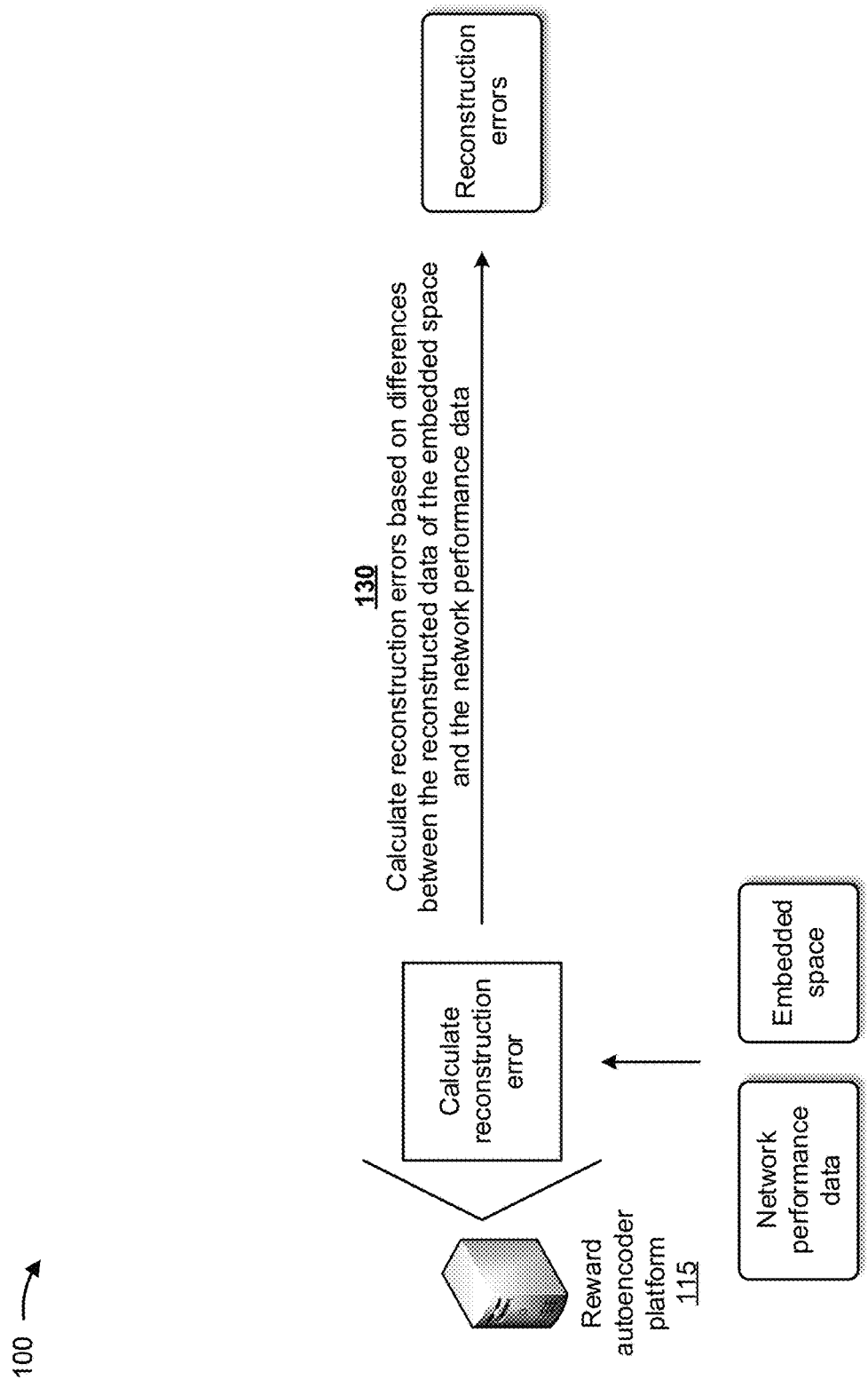

As shown in FIG. 1C, and by reference number 130, reward autoencoder platform 115 may calculate reconstruction errors based on differences between the reconstructed data of the embedded space and the network performance data. For example, reward autoencoder platform 115 may determine a mean squared error associated with generating the embedded space of the reconstructed data by measuring an average squared difference between values of the reconstructed data and values of the network performance data. The mean squared error (e.g., also known as a mean squared deviation) of an estimator (e.g., a procedure for estimating an unobserved quantity) measures an average of squares of errors (e.g., an average squared difference between estimated values and actual values). The mean squared error is a risk function that corresponds to an expected value of a squared error loss.

Figure 1D:
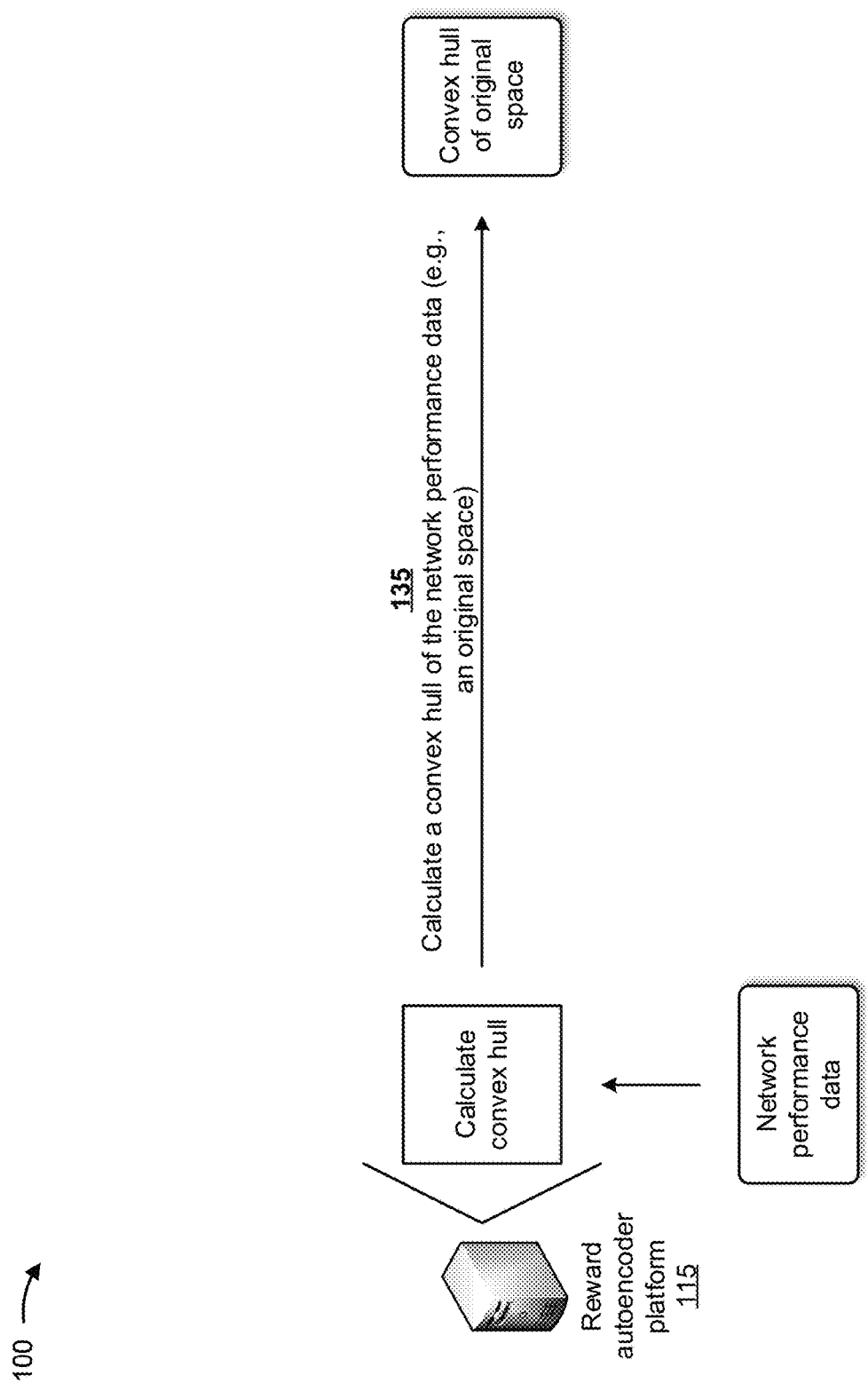

As shown in FIG. 1D, and by reference number 135, reward autoencoder platform 115 may calculate a convex hull of the network performance data (e.g., an original space). A convex hull represents a smallest convex set containing all points in a set of points (e.g., in a Euclidean space), and can be used to help identify the boundaries of a cluster of points. In some implementations, reward autoencoder platform 115 may process the network performance data, using a Riemannian manifold and using a uniform manifold approximation and projection technique, to calculate the convex hull of the original space. The Riemannian manifold may include a topological space that locally resembles a Euclidean space near each point. The Riemannian manifold may include a real, smooth manifold equipped with an inner product on a tangent space at each point that varies smoothly from point to point.

In some implementations, reward autoencoder platform 115 may utilize other neighbor graph methods to calculate the convex hull of the network performance data, such as a k-nearest neighbor graph method. In some implementations, when tuning hyperparameters for calculating the convex hull of the original space, reward autoencoder platform 115 may utilize a greatest quantity of dimensions to render the convex hull computation possible.

Figure 1E:
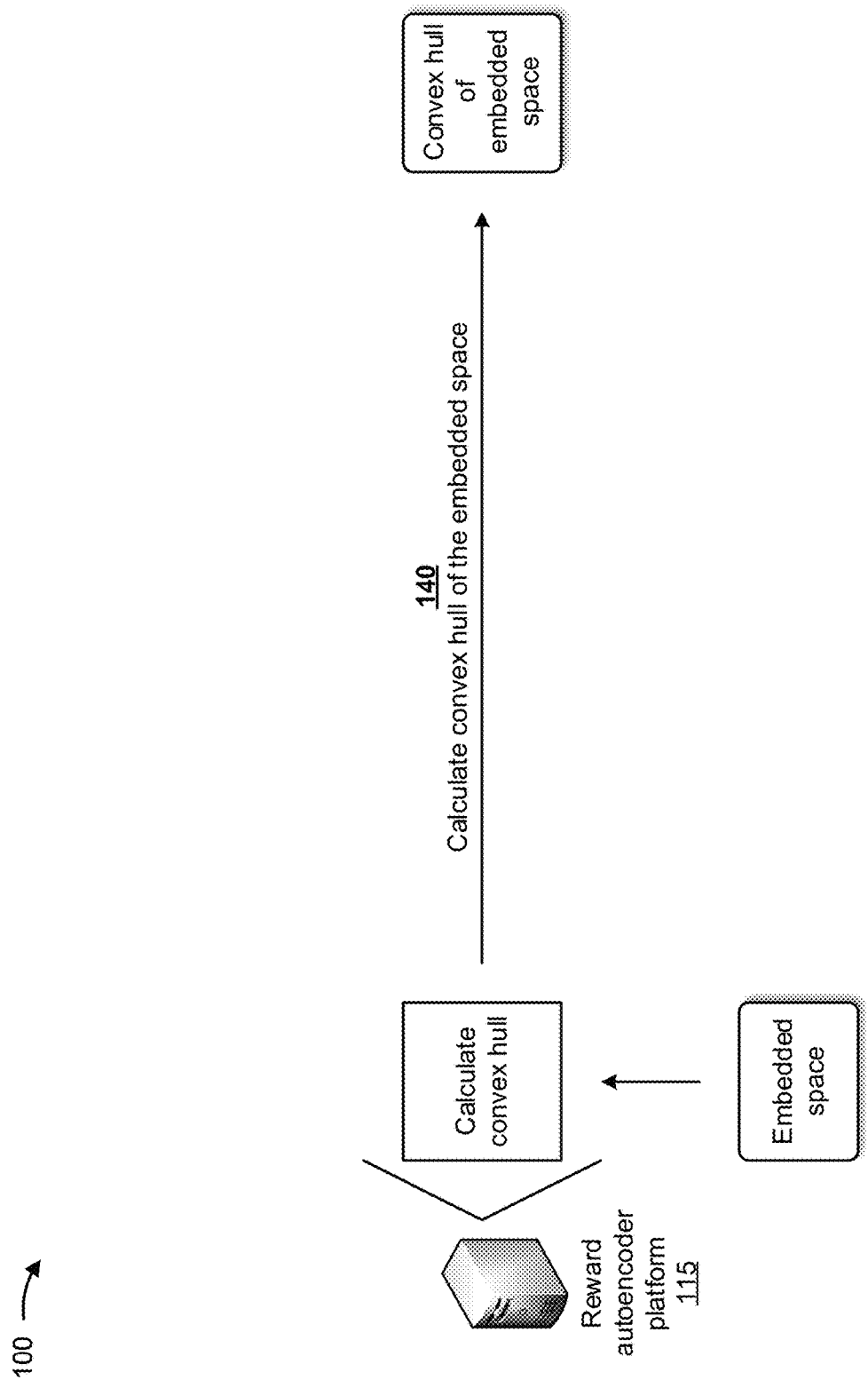

As shown in FIG. 1E, and by reference number 140, reward autoencoder platform 115 may calculate a convex hull of the embedded space. For example, reward autoencoder platform 115 may compute the convex hull of the embedded space based on data identifying a plurality of portions associated with network 110. In some implementations, reward autoencoder platform 115 may compute the convex hull of the embedded space for each portion of the plurality of portions of network 110. In some implementations, when tuning hyperparameters for calculating the convex hull of the embedded space, reward autoencoder platform 115 may utilize a lowest quantity of dimensions to minimize the reconstruction errors of the embedded space.

Figure 1F:
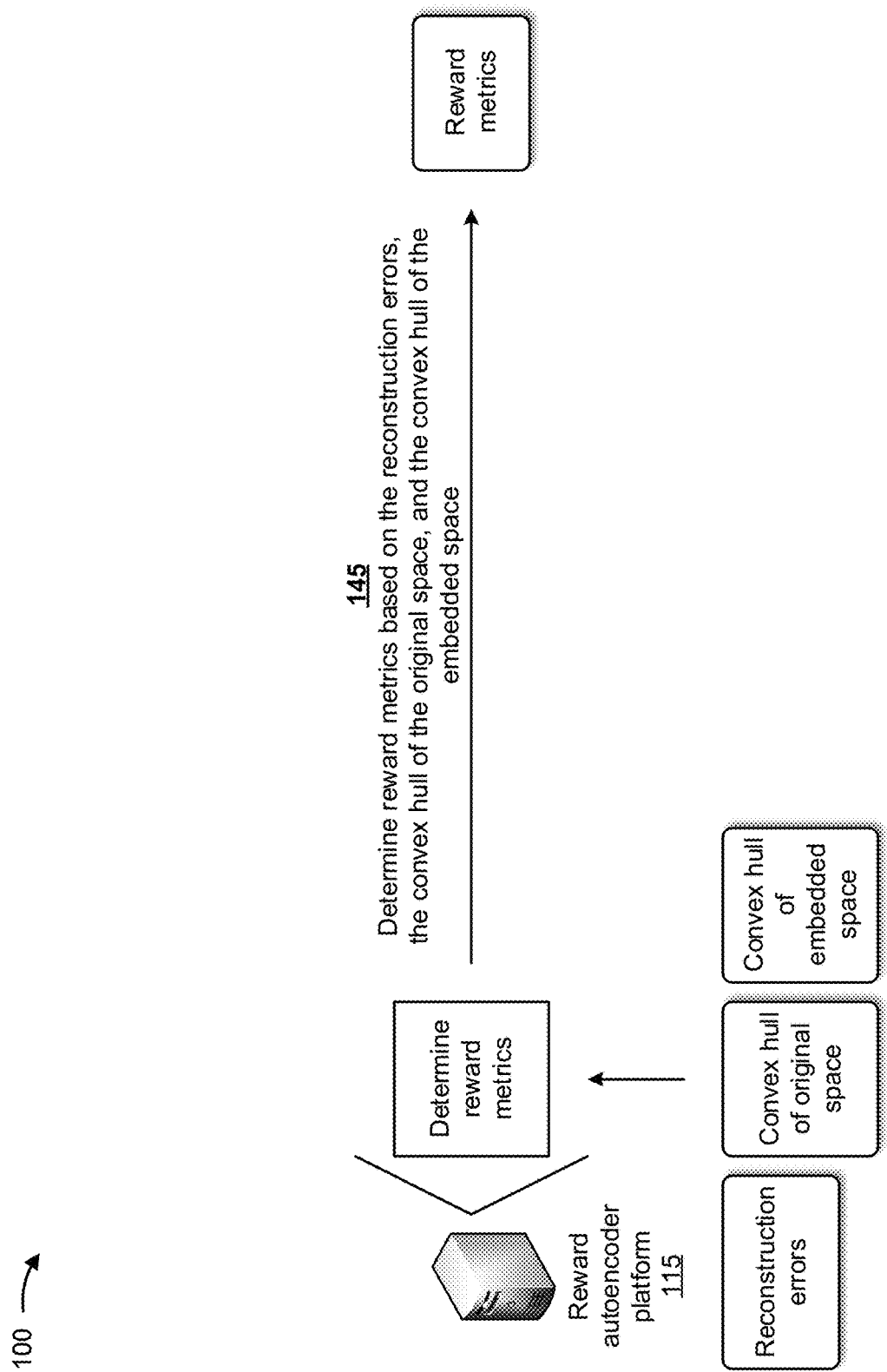

As shown in FIG. 1F, and by reference number 145, reward autoencoder platform 115 may determine reward metrics based on the reconstruction errors, the convex hull of the original space, and the convex hull of the embedded space. In some implementations, reward autoencoder platform 115 may determine reward metrics for each portion of the plurality of portions. The reward metrics may include, for each portion of the plurality of portions, an area associated with the convex hull of the original space, a volume associated with the convex hull of the original space, an area associated with the convex hull of the embedded space, a volume associated with the convex hull of the embedded space, a reconstruction error mean value, a reconstruction error minimum value, a reconstruction error maximum value, a reconstruction error standard deviation value, and/or the like. In some implementations, reward autoencoder platform 115 may save the reward metrics in a data structure (e.g., a database, a table, a list, and/or the like) associated with reward autoencoder platform 115.

As shown in FIG. 1G, and by reference number 150, reward autoencoder platform 115 may define, based on the network policies, performance baselines associated with the plurality of portions of network 110. In some implementations, the performance baselines may be associated with a cluster of multiple portions of network 110 (e.g., portions associated with indicators of desirable network performance), may be predetermined by an expert, may be determined automatically by reward autoencoder platform 115, may be determined randomly by reward autoencoder platform 115 based on particular rules (e.g., low reconstruction error), and/or the like. In some implementations, the performance baselines may be determined based on one or more of network policies associated with network 110. For example, reward autoencoder platform 115 may process the network policies, with a Wasserstein barycenters model, to define the performance baselines associated with the plurality of portions of network 110. The Wasserstein barycenters model may be based on a minimization of a sum of Wasserstein distance differences to each element of datasets associated with the plurality of portions of network 110. Additionally, or alternatively, the performance baselines may be determined based on a reconstruction probability that falls between a minimum and an average of a distribution.

In some implementations, reward autoencoder platform 115 may associate data identifying the plurality of portions with the reward metrics, the reconstruction errors, the convex hull of the original space, and the convex hull of the embedded space. Additionally, reward autoencoder platform 115 may store, in a data structure, the association of the data identifying the plurality of portions with the reward metrics, the reconstruction errors, the convex hull of the original space, and the convex hull of the embedded space.

Figure 1H:
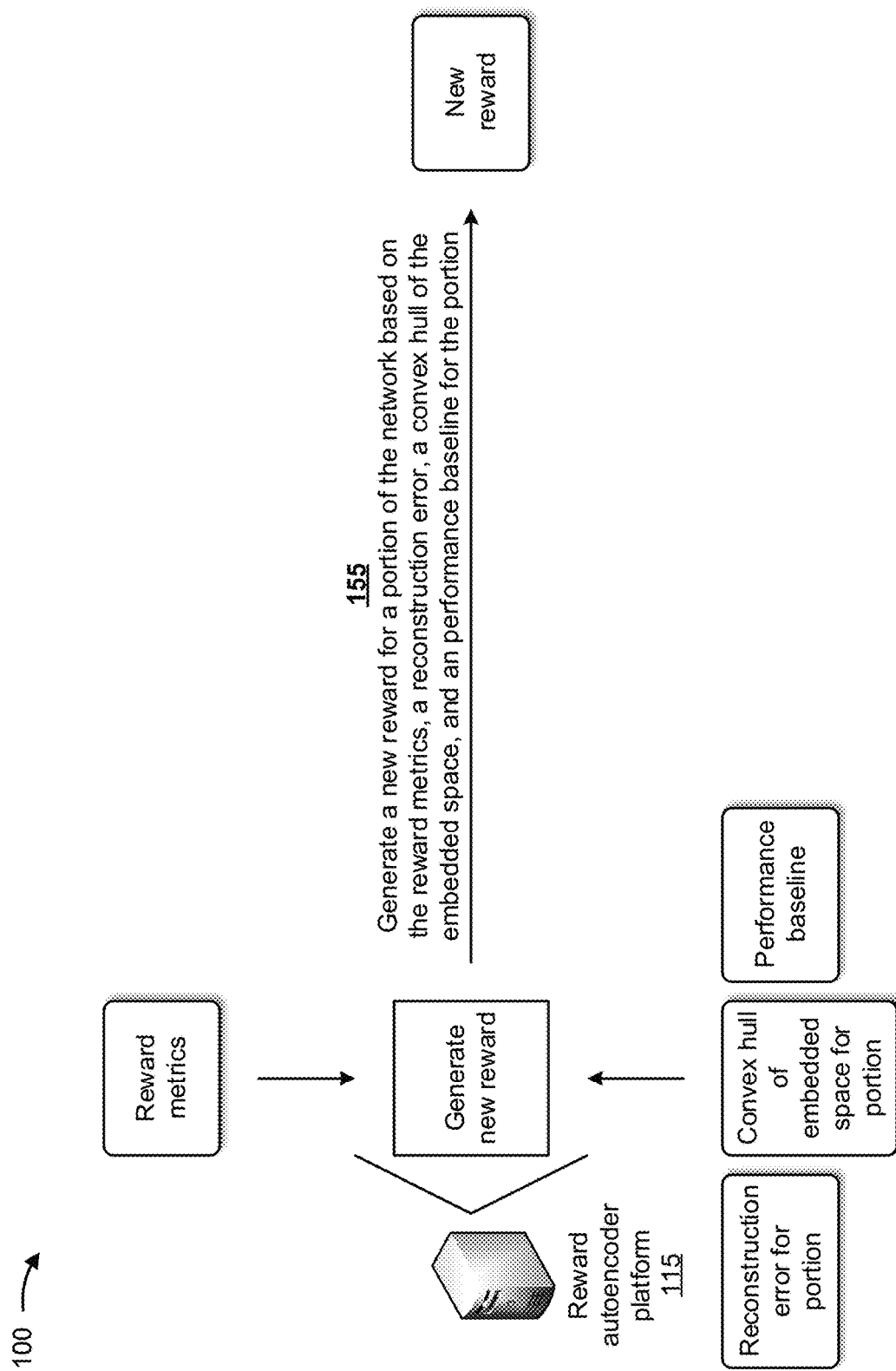

As shown in FIG. 1H, and by reference number 155, reward autoencoder platform 115 may generate a new reward for a portion of network 110 based on the reward metrics, a reconstruction error, a convex hull of the embedded space, and a baseline for the portion of network 110. In some implementations, reward autoencoder platform 115 may process the reward metrics, the reconstruction error, the convex hull of the embedded space, and the performance, with an optimal transport model, to generate the new reward for the portion of network 110 (e.g., using optimal transport theory). Optimal transport theory is a tool to solve problems in machine learning and related fields that offers robust mathematical techniques to study probability measures and compare complex objects described using bags-of-features representations as probability distributions.

In some implementations, reward autoencoder platform 115 may reward good actions (e.g., based on the reward metrics, the reconstruction error, the convex hull of the embedded space, and the performance associated with positive network performance) for the portion of network 110. For example, reward autoencoder platform 115 may generate a positive reward based on improved reconstruction error, improved convex hull distribution, shorter Wasserstein distance to the performance, and/or the like. Similarly, reward autoencoder platform 115 may punish bad actions (e.g., the reward metrics, the reconstruction error, the convex hull of the embedded space, and the performance associated with negative network performance) for the portion of network 110. For example, reward autoencoder platform 115 may generate a negative reward based on degraded reconstruction error, degraded convex hull distribution, longer Wasserstein distance to the performance, and/or the like.

In some implementations, reward autoencoder platform 115 may utilize a machine learning model to perform the functions described above in connection with one or more of FIGS. 1A-1H. For example, reward autoencoder platform 115 may train the machine learning model, with historical network data (e.g., historical network performance data, historical reconstructed data, historical rewards metrics, historical reconstruction errors, historical convex hulls of the original space, historical convex hulls of the embedded space, historical performance baselines, and/or the like) to generate a trained machine learning model that determines a new reward for a portion of network 110 based on reward metrics, a reconstruction error, a convex hull of the embedded space, and a baseline for the portion of network 110. In some implementations, the machine learning model may include an artificial neural network (e.g., an autoencoder) and may employ deep learning (e.g., a specialized form of machine learning based on hierarchical learning and artificial neural networks), reinforcement learning (e.g., an area of machine learning that takes a suitable action to maximize a reward in a particular situation), and/or the like.

In some implementations, reward autoencoder platform 115 may separate the historical network data into a training set, a validation set, a test set, and/or the like. The training set may be utilized to train the machine learning model. The validation set may be utilized to validate results of the trained machine learning model. The test set may be utilized to test operation of the trained machine learning model.

In some implementations, reward autoencoder platform 115 may train the machine learning model using, for example, an unsupervised training procedure and based on the historical network data. For example, reward autoencoder platform 115 may perform dimensionality reduction to reduce the historical network data to a minimum feature set, thereby reducing resources (e.g., processing resources, memory resources, and/or the like) to train the machine learning model, and may apply a classification technique to the minimum feature set.

In some implementations, reward autoencoder platform 115 may use a logistic regression classification technique to determine a categorical outcome (e.g., rewarding or punishing a portion of network 110 based on network performance). Additionally, or alternatively, reward autoencoder platform 115 may use a naïve Bayesian classifier technique. In this case, reward autoencoder platform 115 may perform binary recursive partitioning to split the historical network data into partitions and/or branches, and use the partitions and/or branches to determine outcomes (e.g., rewarding or punishing a portion of network 110 based on network performance). Based on using recursive partitioning, reward autoencoder platform 115 may reduce utilization of computing resources relative to manual, linear sorting and analysis of data points, thereby enabling use of thousands, millions, or billions of data points to train the machine learning model, which may result in more accurate models than using fewer data points.

Additionally, or alternatively, reward autoencoder platform 115 may use a support vector machine (SVM) classifier technique to generate a non-linear boundary between data points in the training set. In this case, the non-linear boundary is used to classify test data into a particular class.

Additionally, or alternatively, reward autoencoder platform 115 may train the machine learning model using a supervised training procedure that includes receiving input to the machine learning model from a subject matter expert, which may reduce an amount of time, an amount of processing resources, and/or the like to train the machine learning model relative to an unsupervised training procedure. In some implementations, reward autoencoder platform 115 may use one or more other model training techniques, such as a latent semantic indexing technique, and/or the like. For example, reward autoencoder platform 115 may perform an artificial neural network processing technique (e.g., using a two-layer feedforward neural network architecture, a three-layer feedforward neural network architecture, and/or the like) to perform pattern recognition with regard to patterns of the historical network data. In this case, using the artificial neural network processing technique may improve an accuracy of the trained machine learning model by making the machine learning model more robust to noisy, imprecise, or incomplete data, and by enabling detection of patterns and/or trends undetectable to human analysts or systems using less complex techniques.

In some implementations, rather than training the machine learning model, reward autoencoder platform 115 may obtain the trained machine learning model from another system or device that trained the machine learning model to generate the trained machine learning model. In this case, reward autoencoder platform 115 may provide the other system or device with the historical network data for use in training the machine learning model, and may provide the other system or device with updated historical network data to retrain the machine learning model in order to update the trained machine learning model.

Figure 1I:
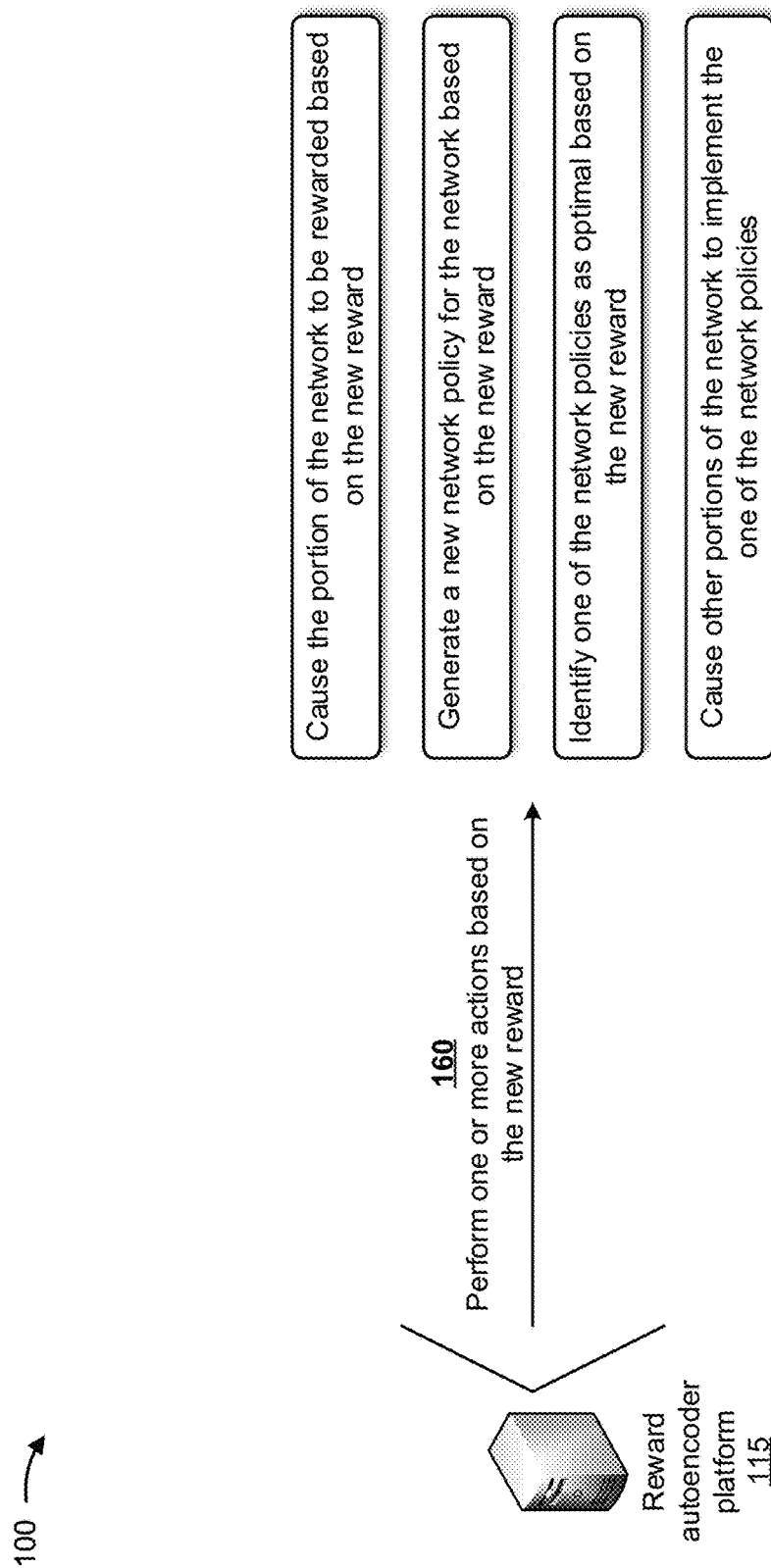

As shown in FIG. 1I, and by reference number 160, reward autoencoder platform 115 may perform one or more actions based on the new reward. In some implementations, the one or more actions may include reward autoencoder platform 115 causing the portion of network 110 to be rewarded based on the new reward. For example, reward autoencoder platform 115 may utilize the new reward to drive optimization activities by control functions that operate the portion of network 110. The new reward would need may be used by the control functions to drive different network device optimizations and results of those optimizations may be measured to determine if the optimizations result in improved performance. In this way, reward autoencoder platform 115 may automatically encourage actions that improve factors associated with good network performance. This may conserve resources that would otherwise be wasted by failing to take actions that improve network performance, failing to emphasize the most significant KPIs, and/or the like.

Accordingly, the portion of network 110 may perform actions that increase rewards, with an expectation that such actions will increase the performance of the portion of network 110. This may increase performance of network 110 and may conserve resources that would otherwise be wasted not implementing the actions that improve factors associated with good network performance.

In some implementations, the one or more actions may include reward autoencoder platform 115 generating a new network policy for network 110 based on the new reward. For example, reward autoencoder platform 115 may automatically generate a network policy that emphasizes actions associated with factors that improve network performance, which deemphasizes actions associated with factors that degrade network performance, and/or the like. Reward autoencoder platform 115 may cause network 110 to implement the new network policy. In this way, reward autoencoder platform 115 may automatically apply the new network policy, without requiring additional human analysis or control, which may conserve resources and improve efficiency associated with managing and/or operating network 110.

In some implementations, the one or more actions may include reward autoencoder platform 115 identifying one of the network policies as optimal based on the new reward. For example, reward autoencoder platform 115 may determine that the new reward is associated with actions that most improve network performance, and that the actions are associated with one of the network policies. Thus, reward autoencoder platform 115 may determine that the one of the network policies is optimal. In this way, reward autoencoder platform 115 may automatically identify a network policy that is most likely to result in improved network performance, thereby improving the efficiency of network 110, conserving networking resources, and/or the like. Furthermore, identifying the one of the network policies as optimal may cause other network policies that are not optimal to be de-emphasized or replaced, which may reduce or prevent reliance on policies that may result in degraded network performance, that are less likely to result in improved network performance, and/or the like.

In some implementations, the one or more actions may include reward autoencoder platform 115 causing other portions of network 110 to implement the one of the network policies. For example, reward autoencoder platform 115 may cause the other portions of network 110 to implement the one of the network policies so that multiple portions of network 110 are performing actions that most improve performance of network 110. In this way, reward autoencoder platform 115 may broaden the applicability of network policies that may improve network performance for multiple portions of network 110. This may conserve computing resources, networking resources, and/or the like, relative to previous policies, and may improve network performance overall for multiple portions of network 110.

In some implementations, different portions of network (e.g., logical entities) may compete for the rewards. For example, reward autoencoder platform 115 may enable such competition based on an automatic rewarding mechanism. Multiple portions of network 110 may define a set of good portions of network 110 and reward autoencoder platform 115 may aggregate the good portions of network 110 into a single virtual network portion. This virtual network portion may capture improved network performance provided by the multiple portions of network 110 and may be used by reward autoencoder platform 115 for comparison and reward determination.

In some implementations, reward autoencoder platform 115 may be utilized to implement a self-optimizing network. For example, reward autoencoder platform 115 may adjust parameters, may modify network policies, may modify network device, and/or the like to implement a self-optimizing network. In one particular example, a Wasserstein distance (e.g., approximated using a Sinkhorn model) between a portion of network 110 (e.g., with a particular quantity of users, a particular network device (e.g., eNodeB), a particular network cell, and a particular frequency) and a performance baseline may be a particular distance (e.g., 0.061). If the distance gets worse from a previous distance, then reward autoencoder platform 115 may generate a negative reward and may trigger an action on the portion of network 110 (e.g., change antenna parameters tilt of the eNodeB).

In this way, several different stages of the process for managing network performance based on defining rewards for a reinforcement learning model are automated, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that manages network performance based on defining rewards for a reinforcement learning model in the manner described herein. Finally, the process for managing network performance based on defining rewards for a reinforcement learning model conserves computing resources, networking resources, and/or the like that would otherwise be wasted in failing to define rewards, managing network performance based on incorrect rewards, correcting an inappropriately managed network, and/or the like.

As indicated above, FIGS. 1A-1I are provided merely as examples. Other examples may differ from what was described with regard to FIGS. 1A-1I. The number and arrangement of devices and networks shown in FIGS. 1A-1I are provided as an example. In practice, there may be additional devices and/or networks, fewer devices and/or networks, different devices and/or networks, or differently arranged devices and/or networks than those shown in FIGS. 1A-1I. Furthermore, two or more devices shown in FIGS.

1A-1I may be implemented within a single device, or a single device shown in FIGS. 1A-1I may be implemented as multiple, distributed devices. Additionally, or alternatively, a set of devices (e.g., one or more devices) of FIGS. 1A-1I may perform one or more functions described as being performed by another set of devices of FIGS. 1A-1I.

Figure 2:
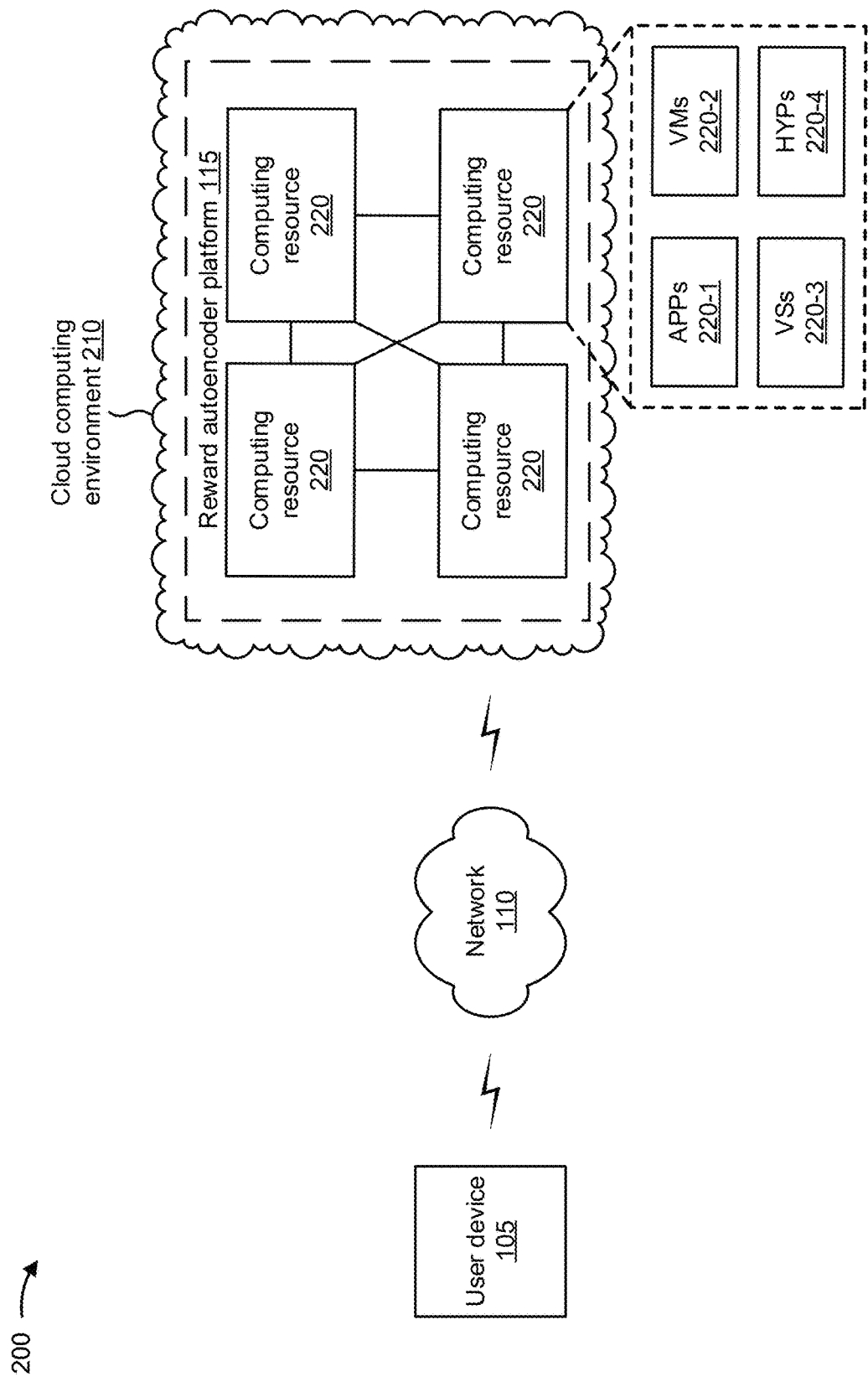
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user device 105, network 110, reward autoencoder platform 115, and a network 110. Devices of environment 200 may interconnect via wired connections, wireless connections, or a combination of wired and wireless connections.

User device 105 includes one or more devices capable of receiving, generating, storing, processing, and/or providing information, such as information described herein. For example, user device 105 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like) or a similar type of device. In some implementations, user device 105 may receive information from and/or transmit information to network 110 and/or reward autoencoder platform 115.

Network 110 includes one or more wired and/or wireless networks. For example, network 110 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. In some implementations, network 110 may receive information from and/or transmit information to user device 105 and/or reward autoencoder platform 115.

Reward autoencoder platform 115 includes one or more devices that manage network performance based on defining rewards for a reinforcement learning model. In some implementations, reward autoencoder platform 115 may be designed to be modular such that certain software components may be swapped in or out depending on a particular need. As such, reward autoencoder platform 115 may be easily and/or quickly reconfigured for different uses. In some implementations, reward autoencoder platform 115 may receive information from and/or transmit information to one or more user devices 105 and/or network 110.

In some implementations, as shown, reward autoencoder platform 115 may be hosted in a cloud computing environment 210. Notably, while implementations described herein describe reward autoencoder platform 115 as being hosted in cloud computing environment 210, in some implementations, reward autoencoder platform 115 may not be cloud-based (i.e., may be implemented outside of a cloud computing environment) or may be partially cloud-based.

Cloud computing environment 210 includes an environment that hosts reward autoencoder platform 115. Cloud computing environment 210 may provide computation, software, data access, storage, etc., services that do not require end-user knowledge of a physical location and configuration of system(s) and/or device(s) that host reward autoencoder platform 115. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices. In some implementations, computing resource 220 may host reward autoencoder platform 115. The cloud resources may include compute instances executing in computing resource 220, storage devices provided in computing resource 220, data transfer devices provided by computing resource 220, etc. In some implementations, computing resource 220 may communicate with other computing resources 220 via wired connections, wireless connections, or a combination of wired and wireless connections.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by user device 105. Application 220-1 may eliminate a need to install and execute the software applications on user device 105. For example, application 220-1 may include software associated with reward autoencoder platform 115 and/or any other software capable of being provided via cloud computing environment 210. In some implementations, one application 220-1 may send/receive information to/from one or more other applications 220-1, via virtual machine 220-2.

Virtual machine 220-2 includes a software implementation of a machine (e.g., a computer) that executes programs like a physical machine. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS"). A process virtual machine may execute a single program and may support a single process. In some implementations, virtual machine 220-2 may execute on behalf of a user (e.g., a user of user device 105 or an operator of reward autoencoder platform 115), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
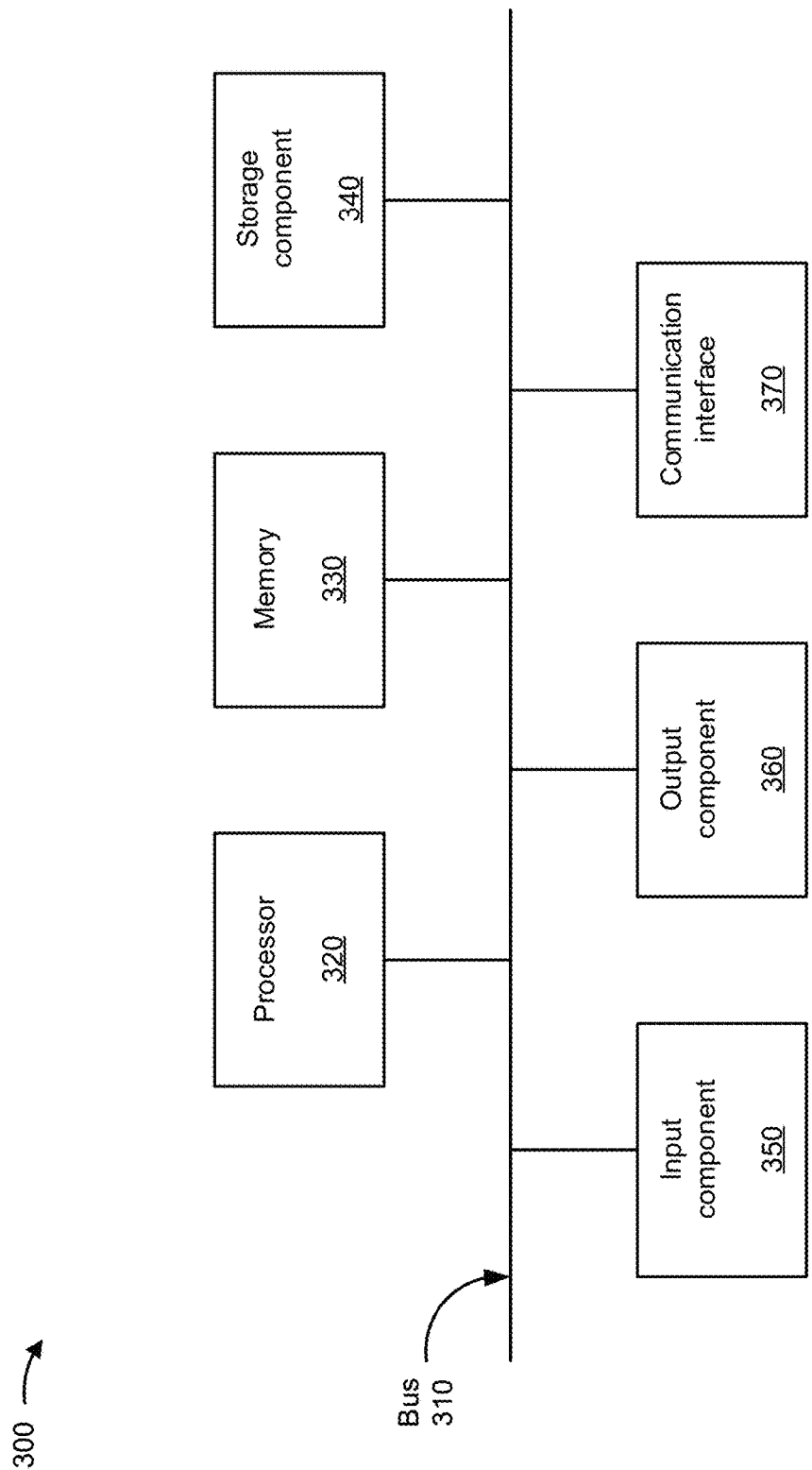
FIG. 3 is a diagram of example components of one or more devices of FIG. 2.

FIG. 3 is a diagram of example components of a device 300. Device 300 may correspond to user device 105, reward autoencoder platform 115, and/or computing resource 220. In some implementations, user device 105, reward autoencoder platform 115, and/or computing resource 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for managing network performance based on defining rewards for a reinforcement learning model. In some implementations, one or more process blocks of FIG. 4 may be performed by a device (e.g., reward autoencoder platform 115). In some implementations, one or more process blocks of FIG. 4 may be performed by another device or a group of devices separate from or including the device, such as a user device (e.g., user device 105) and/or a network device of network 110.

As shown in FIG. 4, process 400 may include receiving network policies associated with a network, and network performance data identifying key performance indicators associated with the network (block 410). For example, the device (e.g., using computing resource, processor 320, communication interface 370, and/or the like) may receive network policies associated with a network, and network performance data identifying key performance indicators associated with the network, as described above. The key performance indicators may include a latency associated with the network, jitter associated with the network, a packet loss associated with the network, utilization associated with the network, throughput associated with the network, a quality of service associated with the network, or a reference signal received power associated with the network or any other radio link measurement. The network performance data may be received from one or more network devices associated with the network, and may be partitioned by various classifications such as geographic areas, time periods, or portions of the network.

As further shown in FIG. 4, process 400 may include generating an embedded space of reconstructed data that is embedded in an original space that includes the key performance indicators, wherein the reconstructed data includes the network performance data after dimensionality reduction and embedding (block 420). For example, the device (e.g., using computing resource, processor 320, memory 330, and/or the like) may generate an embedded space of reconstructed data that is embedded in an original space that includes the key performance indicators, as described above. In some implementations, the reconstructed data may include the network performance data after dimensionality reduction and embedding. In some implementations, generating the embedded space of the reconstructed data may include reducing dimensions of the network performance data to capture features of the network performance data; restoring the dimensions to the network performance data; and applying weights to the network performance data, after restoring the dimensions, based on the features of the network performance data and to generate the reconstructed data of the embedded space. In some implementations, when generating the embedded space of the reconstructed data, process 400 may include processing the network performance data, with a kernel density estimation, to generate the embedded space of the reconstructed data.

As further shown in FIG. 4, process 400 may include calculating reconstruction errors based on differences between the reconstructed data of the embedded space and the network performance data (block 430). For example, the device (e.g., using computing resource, processor 320, storage component 340, and/or the like) may calculate reconstruction errors based on differences between the reconstructed data of the embedded space and the network performance data, as described above.

As further shown in FIG. 4, process 400 may include calculating a convex hull of the original space (block 440). For example, the device (e.g., using computing resource, processor 320, memory 330, and/or the like) may calculate a convex hull of the original space, as described above. In some implementations, calculating the convex hull of the original space may include processing the network performance data, using a Riemannian manifold and a uniform manifold approximation and projection technique, to calculate the convex hull of the original space.

As further shown in FIG. 4, process 400 may include calculating a convex hull of the embedded space (block 450). For example, the device (e.g., using computing resource, processor 320, storage component 340, and/or the like) may calculate a convex hull of the embedded space, as described above. In some implementations, calculating the convex hull of the embedded space may include computing the convex hull of the embedded space based on data identifying the plurality of portions.

As further shown in FIG. 4, process 400 may include determining reward metrics based on the reconstruction errors, the convex hull of the original space, and the convex hull of the embedded space (block 460). For example, the device (e.g., using computing resource, processor 320, memory 330, storage component 340, and/or the like) may determine reward metrics based on the reconstruction errors, the convex hull of the original space, and the convex hull of the embedded space, as described above.

As further shown in FIG. 4, process 400 may include defining, based on the network policies, performance baselines associated with a plurality of portions of the network (block 470). For example, the device (e.g., using computing resource, processor 320, memory 330, and/or the like) may define, based on the network policies, performance baselines associated with a plurality of portions of the network, as described above. In some implementations, defining the performance baselines based on the network policies may include processing the network policies, with a Wasserstein barycenters model, to define the performance baselines associated with the plurality of portions of the network.

As further shown in FIG. 4, process 400 may include generating a new reward for a portion, of the plurality of portions, based on the reward metrics, a particular reconstruction error, a particular convex hull of the embedded space, and a particular performance baseline associated with the portion (block 480). For example, the device (e.g., using computing resource, processor 320, storage component 340, and/or the like) may generate a new reward for a portion, of the plurality of portions, based on the reward metrics, a particular reconstruction error, a particular convex hull of the embedded space, and a particular performance baseline associated with the portion, as described above. In some implementations, generating the new reward for the portion may include processing the reward metrics, the particular reconstruction error, the particular convex hull of the embedded space, and the particular performance baseline, with an optimal transport model, to generate the new reward for the portion.

As further shown in FIG. 4, process 400 may include performing one or more actions based on the new reward (block 490). For example, the device (e.g., using computing resource, processor 320, memory 330, storage component 340, communication interface 370, and/or the like) may perform one or more actions based on the new reward, as described above. In some implementations, performing the one or more actions may include causing the portion to be rewarded based on the new reward; or causing, based on the new reward, a performance of the network to be increased relative to a performance of the network prior to generation of the new reward. In some implementations, performing the one or more actions may include generating a new network policy for the network based on the new reward, and causing the network to implement the new network policy. In some implementations, performing the one or more actions may include identifying, based on the new reward, one of the network policies as optimal relative to network policies, associated with the network, other than the one of the network policies; and causing the plurality of portions to implement the one of the network policies in the network.

Process 400 may include additional implementations, such as any single implementation or any combination of implementations described below and/or in connection with one or more other processes described elsewhere herein.

In some implementations, process 400 may include associating data identifying the plurality of portions with the reward metrics, the reconstruction errors, the convex hull of the original space, and the convex hull of the embedded space; and storing, in a data structure, the association of the data identifying the plurality of portions with the reward metrics, the reconstruction errors, the convex hull of the original space, and the convex hull of the embedded space.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device, network policies associated with a network, and network performance data identifying key performance indicators associated with the network;
generating, by the device, an embedded space of reconstructed data that is embedded in an original space that includes the key performance indicators,
wherein the reconstructed data includes the network performance data after dimensionality reduction and embedding;
calculating, by the device, reconstruction errors based on differences between the reconstructed data of the embedded space and the network performance data;
calculating, by the device, a convex hull of the original space;
calculating, by the device, a convex hull of the embedded space;
determining, by the device, reward metrics based on the reconstruction errors, the convex hull of the original space, and the convex hull of the embedded space;
defining, by the device and based on the network policies, performance baselines associated with a plurality of portions of the network;
generating, by the device, a new reward for a portion, of the plurality of portions, based on the reward metrics, a particular reconstruction error, a particular convex hull of the embedded space, and a particular performance baseline associated with the portion; and
performing, by the device, one or more actions based on the new reward.

2. The method of claim 1, wherein the key performance indicators include one or more of:
a latency associated with the network,
jitter associated with the network,
a packet loss associated with the network,
utilization associated with the network,
throughput associated with the network,
a quality of service associated with the network,
a reference signal received power associated with the network,
bearer drops associated with the network,
handover measurements, or
passive intermodulation interference measurements.

3. The method of claim 1, wherein performing the one or more actions comprises one or more of:
causing the portion to be rewarded based on the new reward; or
causing, based on the new reward, a performance of the network to be increased relative to a performance of the network prior to generation of the new reward.

4. The method of claim 1, wherein performing the one or more actions comprises:
generating a new network policy for the network based on the new reward; and
causing the network to implement the new network policy.

5. The method of claim 1, wherein performing the one or more actions comprises:
identifying, based on the new reward, one of the network policies as optimal relative to network policies, associated with the network, other than the one of the network policies; and
causing the plurality of portions to implement the one of the network policies in the network.

6. The method of claim 1, wherein the network performance data is received from one or more network devices associated with the network.

7. The method of claim 1, wherein generating the embedded space of the reconstructed data comprises:
reducing dimensions of the network performance data to capture features of the network performance data;

restoring the dimensions to the network performance data; and applying weights to the network performance data, after restoring the dimensions, based on the features of the network performance data and to generate the reconstructed data of the embedded space.

8. A device, comprising:

one or more memories; and one or more processors, communicatively coupled to the one or more memories, configured to:

receive network policies associated with a network, and network performance data identifying key performance indicators associated with the network;

generate an embedded space of reconstructed data that is embedded in an original space that includes the key performance indicators, wherein the reconstructed data includes the network performance data after dimensionality reduction and embedding;

calculate reconstruction errors based on differences between the reconstructed data of the embedded space and the network performance data;

calculate a convex hull of the original space;

calculate a convex hull of the embedded space;

determine reward metrics based on the reconstruction errors, the convex hull of the original space, and the convex hull of the embedded space;

define, based on the network policies, performance baselines associated with a plurality of portions of the network;

generate a new reward for a portion, of the plurality of portions, based on the reward metrics, a particular reconstruction error, a particular convex hull of the embedded space, and a particular performance baseline associated with the portion;

identify, based on the new reward, one of the network policies as optimal relative to network policies, associated with the network, other than the one of the network policies; and cause the plurality of portions to implement the one of the network policies in the network.

9. The device of claim 8, wherein the one or more processors, when generating the embedded space of the reconstructed data, are configured to:

process the network performance data, with a kernel density estimation, to generate the embedded space of the reconstructed data.

10. The device of claim 8, wherein the one or more processors, when calculating the convex hull of the original space, are configured to:

process the network performance data, using a Riemannian manifold and a uniform manifold approximation and projection technique, to calculate the convex hull of the original space.

11. The device of claim 8, wherein the one or more processors, when calculating the convex hull of the embedded space, are configured to:

compute the convex hull of the embedded space based on data identifying the plurality of portions.

12. The device of claim 8, wherein the one or more processors are further configured to:

associate data identifying the plurality of portions with the reward metrics, the reconstruction errors, the convex hull of the original space, and the convex hull of the embedded space; and store, in a data structure, the association of the data identifying the plurality of portions with the reward metrics, the reconstruction errors, the convex hull of the original space, and the convex hull of the embedded space.

13. The device of claim 8, wherein the one or more processors, when defining the performance baselines based on the network policies, are configured to:

process the network policies, with a Wasserstein barycenters model, to define the performance baselines associated with the plurality of portions of the network.

14. The device of claim 8, wherein the one or more processors, when generating the new reward for the portion, are configured to:

process the particular reconstruction error, the particular convex hull of the embedded space, and the particular performance baseline, with an optimal transport model, to generate the new reward for the portion.

15. A non-transitory computer-readable medium storing instructions, the instructions comprising:

one or more instructions that, when executed by one or more processors, cause the one or more processors to:

receive network policies associated with a network, and network performance data identifying key performance indicators associated with the network, wherein the key performance indicators include one or more of:

a latency associated with the network, jitter associated with the network, a packet loss associated with the network, utilization associated with the network, throughput associated with the network, a quality of service associated with the network, a reference signal received power associated with the network, bearer drops associated with the network, handover measurements, or passive intermodulation interference measurements;

generate an embedded space of reconstructed data that is embedded in an original space that includes the key performance indicators, wherein the reconstructed data includes the network performance data after dimensionality reduction and embedding;

calculate reconstruction errors based on differences between the reconstructed data of the embedded space and the network performance data;

calculate a convex hull of the original space;

calculate a convex hull of the embedded space;

determine reward metrics based on the reconstruction errors, the convex hull of the original space, and the convex hull of the embedded space;

define, based on the network policies, performance baselines associated with a plurality of portions of the network;

generate a new reward for a portion, of the plurality of portions, based on the reward metrics, a particular reconstruction error, a particular convex hull of the embedded space, and a particular performance baseline associated with the portion; and perform one or more actions based on the new reward.

16. The non-transitory computer-readable medium of claim 15, wherein the one or more instructions, that cause the one or more processors to perform the one or more actions, cause the one or more processors to one or more of:

cause, based on the new reward, a performance of the network to be increased relative to a performance of the network prior to generation of the new reward;

generate a new network policy for the network based on the new reward; or identify, based on the new reward, one of the network policies as optimal relative to network policies, associated with the network, other than the one of the network policies.

17. The non-transitory computer-readable medium of claim 15, wherein the one or more instructions, that cause the one or more processors to generate the embedded space of the reconstructed data, cause the one or more processors to:

reduce dimensions of the network performance data to capture features of the network performance data;

restore the dimensions to the network performance data; and apply weights to the network performance data, after restoring the dimensions, based on the features of the network performance data and to generate the reconstructed data of the embedded space.

18. The non-transitory computer-readable medium of claim 15, wherein the one or more instructions, that cause the one or more processors to calculate the convex hull of the original space, cause the one or more processors to:

process the network performance data, with a Riemannian manifold and a uniform manifold approximation and projection technique, to calculate the convex hull of the original space.

19. The non-transitory computer-readable medium of claim 15, wherein the one or more instructions, that cause the one or more processors to calculate the convex hull of the embedded space, cause the one or more processors to:

compute the convex hull of the embedded space based on data identifying the plurality of portions.

20. The non-transitory computer-readable medium of claim 15, wherein the one or more instructions, that cause the one or more processors to define the performance baselines based on the network policies, cause the one or more processors to:

process the network policies, with a Wasserstein barycenters model, to define the performance baselines associated with the plurality of portions of the network.

* * * * *